United States Patent Office 3,580,960
Patented May 25, 1971

3,580,960
DEHYDROGENATION CATALYST
Ian Montgomery Keen, Wealdstone, Harrow, Peter James Craig, Sunbury, and Christopher Patrick Cadman Bradshaw, Hampton, England, assignors to The British Petroleum Company Limited, London, England
No Drawing. Filed June 18, 1969, Ser. No. 834,557
Claims priority, application Great Britain, July 29, 1968, 35,992/68
Int. Cl. B01j 11/08; C07c 5/18
U.S. Cl. 260—683.3
21 Claims

ABSTRACT OF THE DISCLOSURE

Dehydrogenation catalyst, suitable for the dehydrogenation of alkanes to alkenes, is prepared by ion exchanging a platinum group metal onto a felspar support, preferably albite.

---

This invention relates to dehydrogenation catalysts and to dehydrogenation processes in which they are used.

In copending British applications Nos. 20168/67 and 20167/67 (U.S. application Ser. No. 726,224, filed May 2, 1968, now U.S. Pat. No. 3,527,826, granted Sept. 8, 1970), and in copending British applications Nos. 24523/67 (U.S. application Ser. No. 731,311, filed May 22, 1968) and 42612/67 and 49701/67 (cognate) it is disclosed that a catalyst consisting of a platinum group metal exchanged onto a molecular sieve having a pore size equal to or less than a 5 A. type sieve is effective for the dehydrogenation of normal alkanes to normal olefins of the same carbon number.

We have found that felspar may be used in the place of the molecular sieve as a support for the platinum group metal. We have also found that the catalysts of the present invention besides being useful for the dehydrogenation of n-alkanes to n-alkenes are also suitable for the dehydrocyclization of n-alkanes, for example the preparation of benzene from n-hexane.

Thus according to one aspect of the present invention there is provided a process for the production of a catalyst suitable for the dehydrogenation of n-alkanes which process comprises exchanging a platinum group metal onto a felspar.

By the term "platinum group metal" we mean the metals palladium, platinum, osmium, iridium, ruthenium and rhodium.

A felspar is defined as an aluminosilicate which has an empirical formula approximating to $Na_xK_yCa_zAlSi_3O_8$ where $x+y+2z=1$.

The exchange may take place in two or more stages, each being separated by a reduction of the exchanged ions.

The catalyst may be exchanged with alkali or alkaline earth metal ions after the final reduction.

Suitably the final platinum group metal content of the catalyst is in the range 0.01 to 5% by weight of the total weight of the catalyst, preferably 0.1–1%.

Preferably the platinum group metal is platinum or palladium.

The preferred felspar is albite, which has the empirical formula $NaAlSi_3O_8$. It is a naturally occurring mineral, but can also be synthesised.

Suitably the final alkali or alkaline earth metal ion content of the catalyst is in the range 0.3 to 3.5% by weight of the total weight of the catalyst preferably 0.6 to 1.5%.

Alkali metal ions are more satisfactory than alkaline earth metal ions and the preferred ion is sodium.

According to another aspect of the present invention there is provided a process for the dehydrogenation of a normal alkane which process comprises contacting the alkane at elevated temperature with a platinum group metal loaded felspar.

Suitable normal alkanes which may be dehydrogenated include those containing from 3 to 30, preferably 6 to 18 carbon atoms per molecule.

Dehydrogenation is suitably effected in the range 300–650° C.

Pressure should be between 10 mm. mercury and 1000 p.s.i.g. and preferably between 0 and 50 p.s.i.g.

The alkane may be passed over the catalyst at an LHSV in the range 0.1 to 40 vol./vol. Preferably the alkane LHSV is in the range 2–15 vol./vol.

In order to suppress undesirable side reactions dehydrogenation is preferably effected in the presence of added hydrogen. Suitably the molar ratio of added hydrogen to the alkane feedstock is in the range 0.1–30, preferably between 2 and 10.

Dehydrogenation to n-alkenes is favoured by low temperatures, high space velocities and low pressures.

It is known that in the dehydrogenation of n-alkanes to the corresponding n-alkenes the selectivity to n-alkenes falls as the conversion rises. The partial poisoning by alkali or alkaline earth metal ions permits either the same n-alkene selectivity at a higher conversion, or a higher n-alkene selectivity at the same conversion.

During the reduction of the catalyst it is believed that hydrogen ions are formed on the release of the complexing agent and that exchange of more platinum group metal or of alkali or alkaline earth metal can subsequently take place with these hydrogen ions.

A typical reaction is considered to be:

Exchange
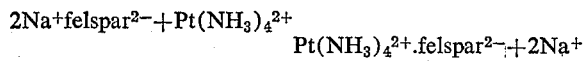

Reduction
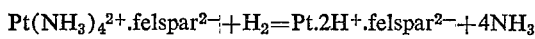

Exchange
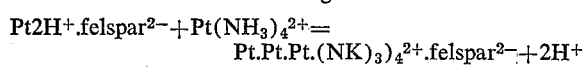

(A catalyst of greater Group VIII metal concentrations may be prepared by further exchanges, e.g., Exchange
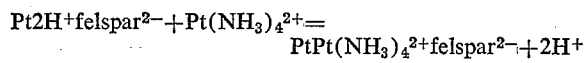

Reduction
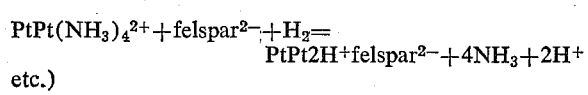
etc.)

Catalysts may also be prepared by direct impregnation with platinum group metal salts. This is not the preferred technique, however.

The sodium ions shown in the first exchange reaction are those normally presented on the felspar. Any deliberate incorporation of alkali or alkaline earth metal ions takes place after reduction and corresponds to the second exchange reaction:

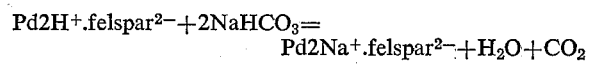

The preferred complexing agents are amines and particularly ammonia.

Preferably the felspar is moistened before it is exchanged by passing air saturated with moisture over it.

Preferably each ion exchange is performed by contacting an aqueous solution of complexed platinum group metal ion with the moist felspar.

Preferably the reduction takes place by contacting the exchanged felspar with hydrogen at elevated temperature.

The invention is illustrated but not limited by the following examples.

EXAMPLE 1

(A) Preparation of albite

Albite was prepared using essentially the method of Barrer & White (J. Chem. Soc., 1952, 1561 and ibid., 1951, 1267). The preparation was in two parts.

(1) *Preparation of gel.*—A solution of 164 g. of commercial sodium aluminate (42% $Na_2O$: 54% $Al_2O_3$) in water (328 g.) was boiled under reflux for two hours to precipitate any iron impurity as $Fe(OH)_3$. After filtration this solution was added dropwise with vigorous stirring to "Syton 2X" (a silica hydrosol, 1240 g. containing 29% wt. $SiO_2$). The resulting thick creamy gel was stirred for two hours to homogenise it.

(2) *Hydrothermal treatment.*—700 mls. of the above gel were heated to 300° C. over a 5-hour period in a nickel lined autoclave. The temperature was maintained at this value for 12 hours and then raised to 375° C. (pressure 3400 p.s.i.g.) where it was maintained for 48 hours. After cooling to ambient temperature the product was filtered to give a dense white crystalline solid which was washed several times with deionised water and dried overnight at 130° C. The product, which weighed 185 g. was shown by optical and X-ray diffraction studies to be almost pure albite containing about 0.2% of nickel as an impurity and had the following characteristics.

Surface area—$m.^2/g.$: <2
Pore volume—ml./g.: <0.01

(B) Platinum exchange and sodium poisoning

A catalyst designated Pt.Na⁺ albite was prepared as follows. 30 g. of albite (30–60 mesh BSS) was contacted with a stirred solution of $Pt(NH_3)_4Cl_2$ (0.264 g.) in water (50 ml.) for 4 hours at 80° C. The product was filtered and washed with distilled water until the washings were chloride free and then dried, first on a Buchner pump and then in nitrogen GHSV 1000, for 3 hours at 120° C. and then at temperatures raised by 50° C. per hour to 450° C. Hydrogen was then passed at GHSV 1000 for 1 hour. After cooling, the product (Pt.H⁺ albite) was carefully moistened and exchanged with 100 ml. of 0.1 N $NaHCO_3$ at 80° C. for 4 hours and then filtered, washed several times with distilled water dried at the pump and then in nitrogen as above. The resulting catalyst Pt.Na⁺ albite was found to contain 0.6% wt. platinum.

(C) Dehydrogenation of hexane 10 ml. of Pt.Na⁺ albite was charged to a quartz reactor, heated to 500° C. and n-hexane was passed at LHSV 1.2 for 45 minutes together with 2.5 moles of hydrogen per mole of hexane. Analysis of the effluent showed that 14.7% of the hexane was converted with 55% selectivity of n-hexenes.

EXAMPLE 2

15 ml. of Pt.Na⁺ albite prepared as in Example 1 was charged to a stainless steel reactor which was then heated to a temperature of 450° C. After purging with nitrogen n-undecane was passed at LHSV 4 together with 2 moles of hydrogen per mole of undecane at a pressure of 25 p.s.i.g. Analysis of the product showed that 13% of the n-undecane was converted with 80% selectivity to n-undecenes.

EXAMPLE 3

The procedure of Example 1 was repeated except that n-hexane was passed at LHSV of 1.2 together with 2.5 moles of hydrogen per mole of n-hexane. The reaction temperature was 550° C. A 73% conversion of the n-hexane was effected to yield a product containing 2% hexenes, 83% benzene, 1% ends and 14% others.

What we claim is:

1. A process for the production of a catalyst suitable for the dehydrogenation of n-alkanes which process comprises exchanging a platinum group metal onto a felspar.

2. A process according to claim 1 wherein, the exchange takes place in two or more stages, each being separated by a chemical reduction of the exchanged ions.

3. A process according to claim 2 wherein the catalyst is exchanged with alkali or alkaline earth metal ions after the final reduction.

4. A process according to claim 1 wherein the final platinum group metal content of the catalyst is in the range 0.01 to 5% by weight of the total weight of catalyst.

5. A process according to claim 4 wherein the final platinum group metal content of the catalyst is in the range 0.1 to 1% by weight.

6. A process according to claim 1 wherein the platinum group metal is platinum or palladium.

7. A process according to claim 1 wherein the felspar is albite.

8. A process according to claim 3 wherein the final alkali or alkaline earth metal ion content of the catalyst is in the range 0.3 to 3.5% by weight of the total weight of catalyst.

9. A process according to claim 8 wherein the content is in the range 0.6 to 1.5%.

10. A process according to claim 8 wherein the alkali metal is sodium.

11. A process for the dehydrogenation of a normal alkane which process comprises contacting the alkane at elevated temperature with a catalyst prepared by exchanging a platinum group metal onto a felspar.

12. A process according to claim 11 wherein the alkane which is dehydrogenated contains from 3 to 30 carbon atoms per molecule.

13. A process according to claim 12 wherein the alkane contains 6 to 18 carbon atoms per molecule.

14. A process according to claim 11 wherein dehydrogenation is effected at a temperature in the range 300 to 650° C.

15. A process according to claim 11 wherein dehydrogenation is effected under a pressure in the range 10 mm. mercury to 1000 p.s.i.g.

16. A process according to claim 15 wherein dehydrogenation is effected under a pressure in the range 0 to 50 p.s.i.g.

17. A process according to claim 11 wherein the alkane is passed over the catalyst at a LHSV in the range 0.1 to 40 vol./vol.

18. A process according to claim 17 wherein the alkane is passed over the catalyst at a LHSV in the range 2 to 15 vol./vol.

19. A process according to claim 11 wherein dehydrogenation is effected in the presence of hydrogen.

20. A process according to claim 19 wherein the molar ratio of hydrogen to alkane is in the range 0.1–30.

21. A process according to claim 20 wherein the molar ratio of hydrogen to alkane is in the range 2 to 10.

References Cited

UNITED STATES PATENTS 3,184,414   5/1955   Koch et al. _____ 252—460X

DELBERT E. GANTZ, Primary Examiner

G. E. SCHMITKONS, Assistant Examiner

U.S. Cl. X.R.

252—455R, 460; 260—668D, 673.5

PO-1050
(5/69)

UNITED STATES PATENT OFFICE
CERTIFICATE OF CORRECTION

Patent No. 3,580,960          Dated May 25, 1971

Inventor(s) Ian Montgomery Keen, Peter James Craig and Christopher P. C. Bradshaw It is certified that error appears in the above-identified patent and that said Letters Patent are hereby corrected as shown below:

Col. 1, Line 24
for "20167/67"     read     --20169/67--

Col. 1, Line 34
for "have found"     read     --have now found--

Col. 1, line 56
for --each--     read     --earth--

Col. 4, Line 3
for "1% ends"     read     --1% light ends--

Signed and sealed this 25th day of January 1972.

(SEAL)
Attest:

EDWARD M. FLETCHER, JR.
Attesting Officer

ROBERT GOTTSCHALK
Commissioner of Patents